(12) United States Patent
Nakazawa et al.

(10) Patent No.: US 7,856,096 B2
(45) Date of Patent: Dec. 21, 2010

(54) ERASURE OF DTMF SIGNAL TRANSMITTED AS SPEECH DATA

(75) Inventors: Tatsuya Nakazawa, Minato-ku (JP); Kazunori Ozawa, Minato-ku (JP)

(73) Assignee: NEC Corporation, Tokyo (JP)

( * ) Notice: Subject to any disclaimer, the term of this patent is extended or adjusted under 35 U.S.C. 154(b) by 1348 days.

(21) Appl. No.: 11/352,321

(22) Filed: Feb. 13, 2006

(65) Prior Publication Data

US 2006/0182233 A1  Aug. 17, 2006

(30) Foreign Application Priority Data

Feb. 14, 2005  (JP) .............................. 2005-036598

(51) Int. Cl.
*H04M 1/00* (2006.01)
(52) U.S. Cl. ...................... 379/386; 379/67.1; 379/283; 379/351; 704/212; 704/222
(58) Field of Classification Search ................. 379/386, 379/67.1, 351, 279–283, 406.01–406.16; 704/201
See application file for complete search history.

(56) References Cited

U.S. PATENT DOCUMENTS

| | | | | |
|---|---|---|---|---|
| 5,889,851 | A * | 3/1999 | Hsieh | 379/351 |
| 7,272,136 | B2 * | 9/2007 | Ahmadi et al. | 370/356 |
| 2005/0105716 | A1 * | 5/2005 | Das et al. | 379/376.02 |
| 2005/0131678 | A1 * | 6/2005 | Chandran et al. | 704/201 |

FOREIGN PATENT DOCUMENTS

| | | |
|---|---|---|
| JP | 62-31241 A | 2/1987 |
| JP | 5-207523 A | 8/1993 |
| JP | 9-64963 A | 3/1997 |
| JP | 9-327047 A | 12/1997 |
| JP | 2000-188611 A | 7/2000 |

* cited by examiner

*Primary Examiner*—Fan Tsang
*Assistant Examiner*—Ibraham Sharifzada
(74) *Attorney, Agent, or Firm*—Sughrue Mion, PLLC

(57) ABSTRACT

A DTMF signal processing apparatus of the present invention comprises a data divider unit, a DTMF signal component analyzer unit, a weighting processing unit, a buffer, a DTMF signal erasure determination unit, and a DTMF signal erasure processing unit. The data divider unit divides speech data into a plurality of divided speech data, and the DTMF signal component analyzer unit analyzes whether or not the divided speech data has a DTMF signal component. The weighting processing unit applies a weighting value to divided speech data analyzed at this time and stores the resultant speech data in the buffer, and also applies a weighting value to past divided speech data previously stored in the buffer when the result of the analysis indicates that the analyzed divided speech data has the DTMF signal component. The DTMF signal erasure determination unit determines based on the weighting value whether or not to erase the divided speech data stored in the buffer. The DTMF signal erasure processing unit replaces the divided speech data with either mute data or noise data, and delivers the replaced data when the result of the determination indicates an erasure.

20 Claims, 6 Drawing Sheets

ERASURE OF DTMF SIGNAL TRANSMITTED AS SPEECH DATA

BACKGROUND OF THE INVENTION

1. Field of the Invention

The present invention relates to a DTMF (Dual Tone Multi Frequency) signal processing method, a DTMF signal processing apparatus, a repeater, and a communications terminal apparatus, and more particularly, to a DTMF signal processing method, a DTMF signal processing apparatus, a repeater, and a communications terminal apparatus which erase a DTMF signal in a bidirectional communication of media data.

2. Description of the Related Art

In recent years, remarkable developments have been attained in VoIP (Voice Over Internet Protocol) which encodes speech data, and arranges the speech encoded data into packets for communication through networks. Also, increasingly more services have been provided for bidirectionally communicating a plurality of media data such as video data, character data and the like as well as speech data. The minimum configuration of a communications system for providing a bidirectional communication service comprises two communications terminal apparatuses between which bidirectional communications are made. However, standardization has not been fully accomplished in communications networks which are disposed between communications terminal apparatuses, call control system, media data encoding system, and communications system.

Examples of bidirectional communication services may include a multi-point teleconference service which permits multiple persons to make bidirectional communications among them, a call service for placing a call between a mobile terminal and an IP terminal. A communications system which provides such a bidirectional communication service realizes bidirectional communications of media data by interposing one or a plurality of repeaters between communications terminal apparatuses.

When a repeater is interposed as mentioned above, a communications terminal apparatus may request the repeater to switch from one service to another. This switching can be made by sending a DTMF signal as speech data, and by detecting the DTMF signal in the repeater, and switching the service, other than by using a call control message. In particular, a mobile terminal is highly likely to utilize the DTMF signal for switching in view of its configuration.

In a communications system as described above, even though the DTMF signal transmitted as speech data is information necessary for the repeater in order to switch services, the DTMF signal is unnecessary data for other repeaters which are installed beyond the repeater or for communications terminal apparatuses.

For this reason, repeaters and destination communications terminal apparatuses are expected to implement steps to erase the DTMF signal. For example, the repeater can replace speech data with either mute data or noise data in a section of the DTMF signal, again encode the resultant speech data, and send the speech encoded data in packets, or can omit transmission of packets in the section of the DTMF signal. The destination communications terminal apparatus in turn can replace speech data in a section of the DTMF signal with either mute data or noise data, and reproduce the resultant speech data to permit the user to hear the speech data, in a manner similar to that of the repeater.

As a related technology of this type, JP-A-2000-188611 (hereinafter called "Document 1") discloses a communications apparatus which transfers a DTMF signal from a call communication path to a destination as data, and prevents double reception of the DTMF signal at the destination. Also, techniques for detecting the DTMF signal are described in JP-A-1997-327047 and JP-A-1993-207523 (hereinafter called "Document 2" and "Document 3," respectively).

To erase speech data in a section of a DTMF signal, speech encoded data must be decoded, the decoded speech data must be accumulated for a certain section, and a determination must be made as to whether or not the speech data in the section is a DTMF signal in order to prevent an erroneous erasure. For this reason, an increased delay in speech is inevitable between communications terminal apparatuses, as compared with the case where the DTMF signal is not erased. Moreover, considering that the above-mentioned operations are performed during bidirectional communication in a communications system which comprises one or a plurality of intervening repeaters, the increased delay in speech will significantly impede the serviceability.

Also, in determining whether or not a DTMF signal is present, factors such as whether some packets have been lost in a packet network or the like, or whether data has been lost or corrupted due to radio errors or the like on a mobile network, must be also taken into account.

SUMMARY OF THE INVENTION

It is therefore an object of the present invention to provide a DTMF signal processing method, a DTMF signal processing apparatus, a repeater, and a communications terminal apparatus which are capable of erasing a DTMF signal such that the DTMF signal is not heard by a user of the communications terminal apparatus at the destination for speech data while suppressing a delay in speech associated with the erasure of the DTMF signal.

A DTMF signal processing apparatus of the present invention comprises data dividing unit, DTMF signal component analyzing unit, weighting processing unit, a buffer, DTMF signal erasure determining unit, and DTMF signal erasure processing unit.

The data dividing unit divides speech data into a plurality of divided speech data, and the DTMF signal component analyzing unit analyzes whether or not the divided speech data has a DTMF signal component.

The weighting processing unit applies a weighting value to divided speech data analyzed at this time and stores the resultant speech data in the buffer, and also applies a weighting value to past divided speech data previously stored in the buffer when the result of the analysis indicates that the analyzed divided speech data has a DTMF signal component.

The DTMF signal erasure determining unit determines based on the weighting value whether or not to erase the divided speech data stored in the buffer.

The DTMF signal erasure processing unit replaces the divided speech data with either mute data or noise data, and delivers the replaced data when the result of the determination indicates that the data should be erased.

According to the present invention, since the erasure processing is performed for each unit of divided speech data to replace the divided speech data with mute data or noise data based on the weighting value, the erasure processing need not be performed after certain speech data has been accumulated. It is therefore possible to erase the DTMF signal while suppressing a delay in speech associated with the erasure processing.

The above and other objects, features, and advantages of the present invention will become apparent from the follow-

DESCRIPTION OF THE PREFERRED EMBODIMENT

Embodiment 1

Figure 1:
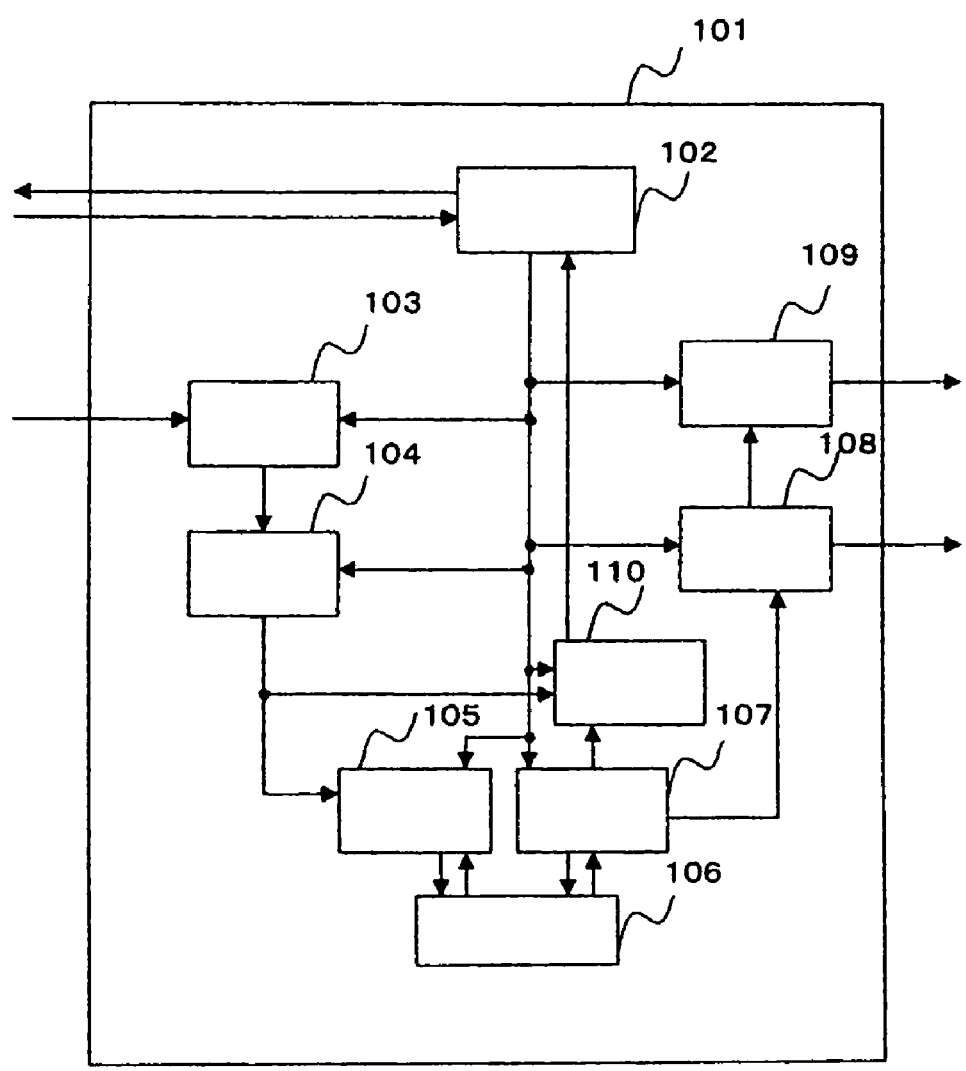
FIG. 1 is a block diagram illustrating the configuration of a DTMF signal processing apparatus according to Embodiment 1 of the present invention.

Referring to FIG. 1, there is illustrated the configuration of DTMF signal processing apparatus 101 according to Embodiment 1 of the present invention. This DTMF signal processing apparatus 101 comprises setting/control processing unit 102, data divider unit 103, DTMF signal component analyzer unit 104, weighting processing unit 105, buffer unit 106, DTMF signal erasure determination unit 107, DTMF signal erasure processing unit 108, data multiplexer unit 109, and DTMF signal section detector unit 110.

Setting/control processing unit 102 provides necessary information to data divider unit 103, DTMF signal component analyzer unit 104, weighting processing unit 105, DTMF signal erasure determination unit 107, DTMF signal erasure processing unit 108, data multiplexer unit 109, and DTMF signal section detector unit 110, and transmits and receives control information to and from an external device. Setting/control processing unit 102 also transmits a detection notice from DTMF signal section detector unit 110, later described, to an external device.

Data divider unit 103 divides speech data received from an external device by a fixed section length previously determined by setting/control processing unit 102, and supplies a plurality of divided speech data to DTMF signal component analyzer unit 104.

DTMF signal component analyzer unit 104 analyzes the divided speech data supplied from data divider unit 103 to determine whether or not the divided speech data has a DTMF signal component. DTMF signal component analyzer unit 104 also supplies weighting processing unit 105 with the result of the analysis as to whether or not the divided speech data has a DTMF signal component, a DTMF number resulting from the analysis, electric power in the section of divided speech data, and the like together with the divided speech data. DTMF signal component analyzer unit 104 may analyze the divided speech data by the methods described in Documents 2, 3 and the like, or by another analyzing method, not particularly limited to the present invention.

Weighting processing unit 105 weights currently divided speech data supplied from DTMF signal component analyzer unit 104 at this time and past divided speech data stored in buffer unit 106 based on the result of the analysis, provided from DTMF signal component analyzer unit 104, indicating whether or not the divided speech data has a DTMF signal component.

Specifically, weighting processing unit 105 simply stores divided speech data supplied from DTMF signal component analyzer unit 104 at this time in buffer unit 106 when the divided speech data does not have a DTMF signal component. On the other hand, when the divided speech data supplied from DTMF signal component analyzer unit 104 at this time has a DTMF signal component, weighting processing unit 105 applies a weighting value to the divided speech data, stores the weighted divided speech data in buffer unit 106, and also applies a weighting value to past divided speech data stored in buffer unit 106 (DTMF signal front section weighting processing). In this event, weighting processing unit 105 applies a larger weighting value to the currently divided speech data having the DTMF signal component, as compared with the weighting value applied to past divided speech data. Also, when divided speech data supplied from DTMF signal component analyzer unit 104 has the DTMF signal component, weighting processing unit 105 sets a hangover value to an effective value previously set by setting/control processing unit 102. Subsequently, during the period when the hangover value remains effective, weighting processing unit 105 applies a previously determined weighting value to divided speech data supplied from DTMF signal analyzer unit 104 (DTMF signal rear section weighting processing) even if it does not have the DTMF component. This DTMF signal rear section weighting processing is also performed for the purpose of erasing speech data in a rear section, similar to the DTMF signal front section weighting processing.

Incidentally, in some cases, DTMF signal processing apparatus 101 may be fed only with data loss/error information, where this data loss/error information indicates that certain data has been lost or corrupted. In this event, data divider unit 103 generates either mute data or noise data as an alternative to divided speech data. None of this mute data or noise data is processed in DTMF signal component analyzer unit 104, and is supplied to weighting processing unit 105. Then, weighting processing unit 105 applies the mute data or noise data with the same weighting value as that applied to the preceding divided speech data stored in buffer unit 106, and stores the weighted mute data or noise data in buffer unit 106.

Also, in some cases, DTMF signal processing apparatus 101 may be fed with both data loss/error information and speech data, where the data loss/error information indicates that certain data has been lost or corrupted. In this event, weighting processing unit 105 weights the divided speech data supplied from DTMF signal component analyzer unit 104 at this time based on the result of the analysis provided from DTMF signal component analyzer unit 104, as described above. Alternatively, weighting processing unit 105 may perform one of the following processes (A), (B).

(A) The currently divided speech data is applied with the same weighting value as that applied to the preceding divided speech data stored in buffer unit 106 irrespective of the result of the analysis provided from DTMF signal component analyzer unit 104.

(B) When divided speech data is indicated to have a DTMF signal component in the result of the analysis which is provided after the condition for analyzing has been relaxed in DTMF signal component analyzer unit 104, the currently divided speech data is applied with a weighting value, and previously stored past divided speech data are also applied with a weighting value.

The foregoing processes (A), (B) are preferably switched in accordance with an input condition such as whether speech data generated at the time of a data loss or a data error is speech data generated by concealing processing which is performed in accordance with a speech coding standard. In other words, setting/control processing unit 102 determines which of the foregoing (A), (B) should be employed depending on degree to which the frequency characteristic of the generated speech data is correctly restored. Also, setting/control processing unit 102 has previously performed external processing with an external device, and controls the input condition based on the result of the external processing such that appropriate operations can be carried out in data divider unit 103, DTMF signal component analyzer unit 104, and weighting processing unit 105.

Figure 2:
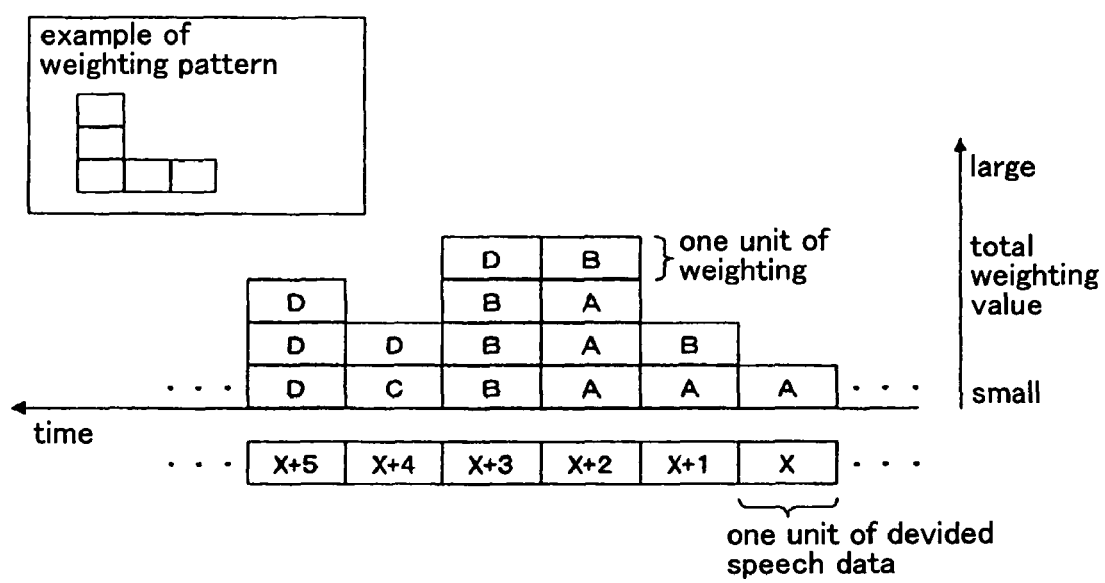
FIG. 2 is a diagram for describing weighting processing according to Embodiments 1, 2 of the present invention.

Next, weighting processing performed by weighting processing unit 105 according to Embodiment 1 of the present invention will be described with reference to FIG. 2. In FIG. 2, the horizontal axis represents time, where time passes in the left-hand direction, and the vertical axis represents the magnitude of the weighting value. Assume herein that each of X-th to (X+5)th divided speech data is weighted according to the following procedures (1)-(5). Assume also that in FIG. 2, (X+2)th, (X+3)th, and (X+5)th divided speech data have the DTMF signal component, and an effective hangover value is equal to or more than one. Further, assume in FIG. 2 that when N-th divided speech data has the DTMF signal component, the N-th, (N−1)th, and (N−2)th divided speech data are applied with weighting values of three units, one unit, and one unit, respectively.

(1) In weighting processing for the X-th and (X+1)th divided speech data, no weighting value is applied to them because none of the divided speech data have the DTMF component.

(2) In weighting processing for the (X+2)th divided speech data, since the divided speech data has the DTMF component, the hangover value is set to one or more, the X-th and (X+1)th divided speech data are applied with a weighting value (one unit of weighting), and the (X+2)th divided speech data itself is applied with a weighting value (three units of weighting) larger than that applied to the X-th and (X+1)th divided speech data (A in FIG. 2).

(3) In weighting processing for the (X+3)th divided speech data, since the divided speech data has the DTMF component, the hangover value is set to one or more, the (X+1)th and (X+2)th divided speech data are applied with a weighting value (one unit of weighting), and the (X+3)th divided speech data itself is applied with a weighting value (three units of weighting) larger than that applied to the (X+1)th and (X+2)th divided speech data (B in FIG. 2).

(4) In weighting processing for the (X+4)th divided speech data, though the divided speech data does not have the DTMF component, the hangover value is effective, so that the (X+4)th divided speech data is applied with the previously determined weighting value [one unit of weighting (C in FIG. 2)].

(5) In weighting processing for the (X+5)th divided speech data, since the divided speech data has the DTMF component, the hangover value is set to one or more, the (X+3)th and (X+4)th divided speech data are applied with a weighting value (one unit of weighting), and the (X+5)th divided speech data itself is applied with a weighting value (three units of weighting) larger than that applied to the (X+3)th and (X+4)th divided speech data (D in FIG. 2).

It should be understood that the number of divided speech data which are applied with weighting values, the weighting values applied to the respective divided speech data, and the like in FIG. 2 are mere examples simply for facilitating the description, and are not necessarily limited to those shown in FIG. 2.

Buffer unit 106 stores divided speech data and a weighting value applied to the divided speech data.

DTMF signal erasure determination unit 107 retrieves the earliest stored divided speech data in buffer unit 106 and scheduled to be delivered in the next processing, and determines whether or not this divided speech data should be erased. Here, DTMF signal erasure determination unit 107 determines that the divided speech data retrieved should be erased when at least one of the following condition (a) and (b) is satisfied in a certain range starting from the retrieved divided speech data.

(a) The number of divided speech data, among divided speech data in the certain range, which have a weighting value that reaches a previously determined value, reaches a predefined number.

(b) The sum total of the weighting values applied to the divided speech data in the certain range reaches a predefined value.

Further, DTMF signal erasure determination unit 107 supplies the divided speech data retrieved from buffer unit 106 to DTMF signal erasure processing unit 108 together with the result of the determination indicating whether or not the divided speech data should be erased. When DTMF signal erasure determination unit 107 has determined that divided speech data previously supplied to DTMF signal erasure processing unit 108 should be erased, and if a weighting value applied to divided speech data retrieved at this time has any value (not zero), DTMF signal erasure determination unit 107 changes the result of the determination indicating that divided speech data retrieved at this time should be erased, and supplies DTMF signal erasure processing unit 108 with the result of the determination and the divided speech data.

When the result of the determination provided from DTMF signal erasure determination unit 107 indicates that the divided speech data should be erased, DTMF signal erasure processing unit 108 performs erasure processing which involves replacement of the divided speech data supplied from DTMF signal erasure determination unit 107 with either mute data or noise data, and supplies the replaced data to data multiplexer unit 109 together with the result of the determination.

Data multiplexer unit 109 accumulates the divided speech data supplied from DTMF signal erasure processing unit 108 until the accumulated data reaches a fixed section length instructed from setting/control processing unit 102, and multiplexes the speech data every fixed section length for transmission to an external device. Further, if erasure processing has been performed on at least one unit of divided speech data included in the speech data of the fixed section length, data multiplexer unit 109 transmits the result of the determination that the multiplexed speech data should be erased to the external device together with the multiplexed speech data. In this embodiment, the divided speech data is multiplexed for every fixed section length that is suited for transmission to the destination thereto, but the divided speech data may be transmitted as it is to an external device by DTMF signal erasure processing unit 108 without multiplexing. In this event, DTMF signal erasure processing unit 108 transmits the aforementioned result of the determination to the external device. Also, the result of the determination as to whether or not the speech data should be erased may not be transmitted unless the destination needs to reference it.

DTMF signal section detector unit 110 determines whether or not a DTMF signal has been detected in a certain section, making use of at least one of the result of the analysis provided from DTMF signal component analyzer unit 104 indicating whether or not divided speech data includes a DTMF signal component and the result of the determination provided from DTMF signal erasure determination unit 107 whether or not divided speech data should be erased, and notifies setting/control processing unit 102 of the result of the determination. When setting/control processing unit 102 determines whether or not a DTMF signal has been detected in a certain section making use of the notification from DTMF signal section detector unit 110, setting/control processing unit 102 may utilize the method described in Document 2 or the like.

In this embodiment as described above, received speech data is first divided into a plurality of divided speech data, and an analysis is made on each unit of the divided speech data to determine to whether or not a DTMF signal is included therein. Next, a weighting value is applied to the divided speech data based on the result of the analysis, and a weighting value is also applied to previously stored divided speech data. Next, it is determined based on the weighting value whether or not the divided speech data should be erased, and erasure processing is performed based on the result of the determination to replace the divided speech data with either mute data or noise data.

Consequently, since certain speech data need not be accumulated until the erasure processing is actually performed, the DTMF signal can be erased while suppressing a delay in speech associated with erasure processing.

Embodiment 2

Figure 3:
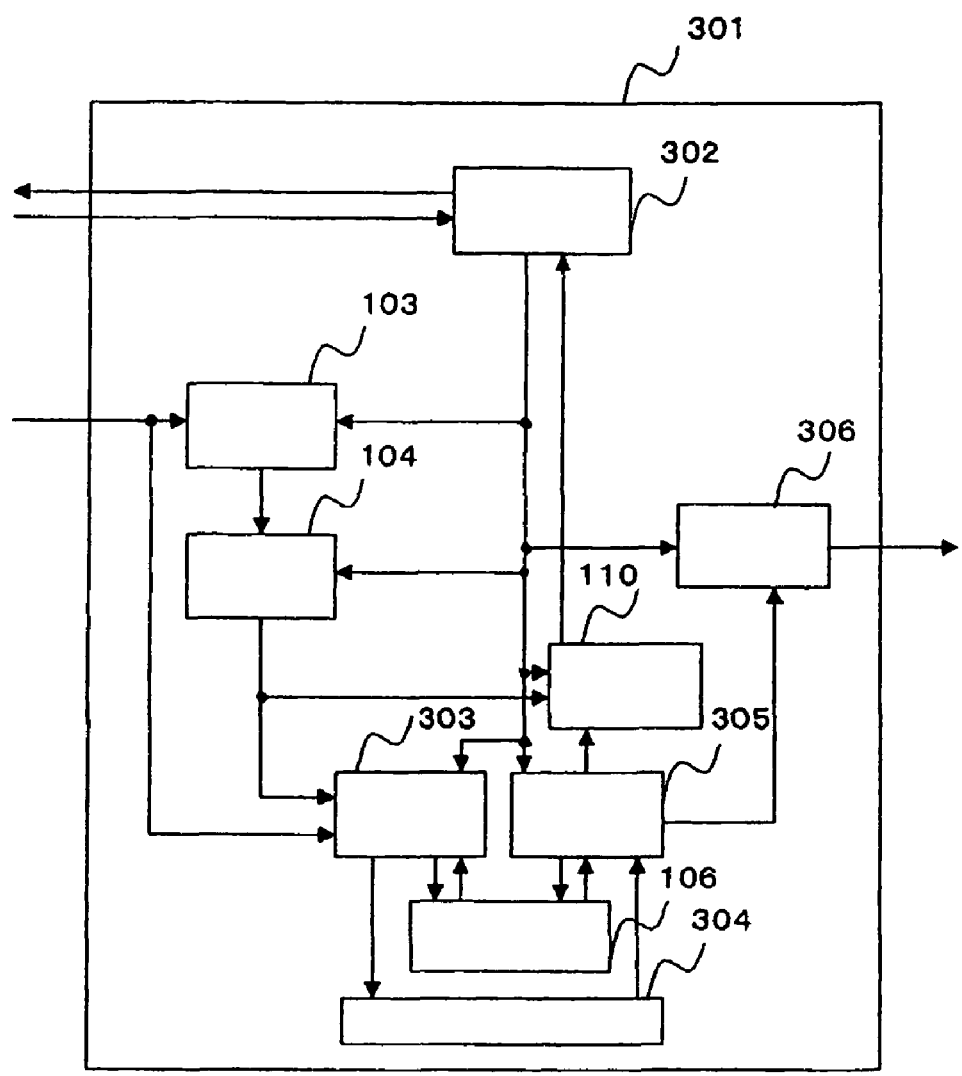
FIG. 3 is a block diagram illustrating the configuration of a DTMF signal processing apparatus according to Embodiment 2 of the present invention.

Referring to FIG. 3, there is illustrated the configuration of DTMF signal processing apparatus 301 according to Embodiment 2 of the present invention. This DTMF signal processing apparatus 301 comprises setting/control processing unit 302, data divider unit 103, DTMF signal component analyzer unit 104, weighting processing unit 303, buffer unit 106, buffer unit 304 as encoded data buffer, DTMF signal erasure determination unit 305, DTMF signal erasure processing unit 306, and DTMF signal section detector unit 110.

In FIG. 3, the same components as those in FIG. 1 are designated the same reference numerals. Setting/control processing unit 302, weighting processing unit 303, DTMF signal erasure determination unit 305, and DTMF signal erasure processing unit 306 correspond to setting/control processing unit 102, weighting processing unit 105, DTMF signal erasure processing determination unit 107, and DTMF signal erasure processing unit 108, respectively.

The following description will be centered on those aspects which differ from Embodiment 1 in FIG. 1. Assume that DTMF signal processing unit 301 also receives speech encoded data which corresponds to the fixed section length of speech data before the speech data is decoded, in addition to the speech data and data loss/error information. Assume also that the speech encoded data is processed in accordance with the same speech coding standard in input/output sections of DTMF signal processing unit 301.

Setting/control processing unit 302 has similar functions to those of setting/control processing unit 102 of Embodiment 1. Other than these functions, setting/control processing unit 302 has additional functions of acquiring information of the speech coding standard of speech encoded data fed thereto from an external device, and providing the acquired information to data divider unit 103, DTMF signal component analyzer unit 104, weighting processing unit 303, DTMF signal erasure determination unit 305, DTMF signal erasure processing unit 306, and DTMF signal section detector unit 110.

The speech encoded data is directly fed to weighting processing unit 303 from an external device without passing data divider unit 103 and DTMF signal analyzer unit 104. Speech data in turn is fed to weighting processing unit 303 from an external device through data divider unit 103 and DTMF signal analyzer unit 104, in a manner similar to Embodiment 1.

Weighting processing unit 303 weights divided speech data supplied from DTMF signal analyzer unit 104 in a manner similar to weighting processing unit 103 of Embodiment 1, stores the divided speech data and a weighting value applied to the divided speech data in buffer unit 106, and stores the speech encoded data directly fed from the external device in buffer unit 304.

DTMF signal erasure processing determination unit 305 retrieves a weighting value from buffer unit 106, and retrieves speech encoded data corresponding to the retrieved weighting value from buffer unit 304. Next, DTMF signal erasure processing determination unit 305 determines whether or not each of the sections corresponding to the divided speech data in the speech encoded data should be erased on a section-by-section basis by a method similar to that of Embodiment 1. Then, DTMF signal erasure processing determination unit 305 supplies DTMF signal erasure processing unit 306 with the result of the determination together with the speech encoded data retrieved from buffer unit 304. It should be noted that a plurality of divided speech data may represent a section length corresponding to one unit of speech encoded data. In this event, DTMF signal erasure processing determination unit 305 may retrieve the speech encoded data from buffer unit 304 at any time as long as this time falls within the period in which the DTMF signal erasure processing determination unit 305 is making the determination in accordance with the weighting value applied to the divided speech data within the section length. Also, while the divided speech data is stored together with the weighting value in Embodiment 1, the divided speech data may or may not be stored in buffer unit 106 in Embodiment 2.

When at least one result of the determination for each section within speech encoded data, provided from DTMF signal erasure processing determination unit 305, indicates that the section should be erased, DTMF signal erasure processing unit 306 determines that the speech encoded data should be erased. Then, DTMF signal erasure processing unit 306 replaces the speech encoded data, for which a determination to erase has been made with speech encoded data corresponding to mute data or noise data, and transmits the replaced data to an external device together with the result of the determination that the section should be erased. On the other hand, when It is determined that speech encoded data is not to be erased, DTMF signal erasure processing unit 306 transmits the speech encoded data together with the result of the determination that the speech encoded data is not erased. The result of determination as to whether or not the speech encoded data should be erased may not be transmitted unless the destination needs to reference it.

As described above, while this embodiment is based on the premise that the speech encoded data is processed in accordance with the same speech coding standard in input/output sections of DTMF signal processing unit 301, this embodiment can also provide similar advantages to Embodiment 1 when erasure processing is performed in units of speech encoded data.

Specifically, this embodiment comprises buffer 304 for storing speech encoded data on the assumption that speech encoded data is fed from the outside. Moreover, divided speech data is weighted by a weighting method similar to that of Embodiment 1, and a determination is made as to whether speech encoded data should be erased by a similar determination method. Then, in accordance with the result of the determination, the speech encoded data is replaced with speech encoded data corresponding to mute data or noise data.

Consequently, when the speech encoded data is processed in accordance with the same speech coding standard in the input/output sections of DTMF signal processing unit 301, the DTMF signal can be erased while suppressing a delay in speech associated with the erasure processing, as is the case with Embodiment 1.

Embodiment 3

Figure 4:
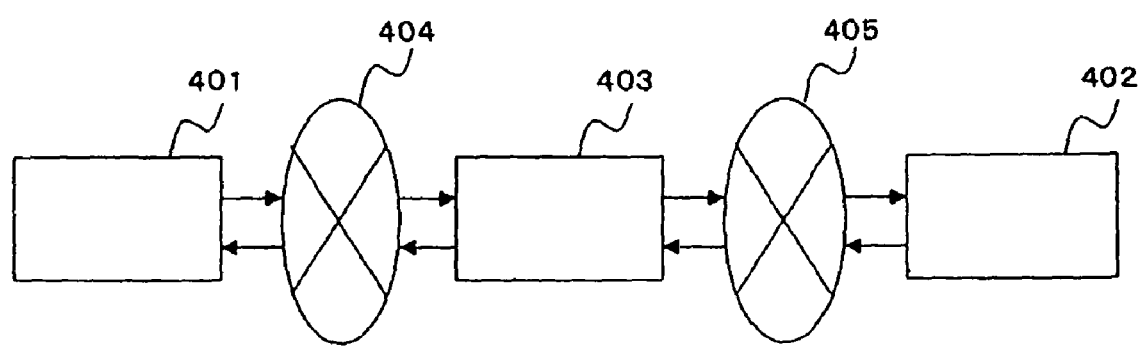
FIG. 4 is a diagram illustrating the general configuration of a communications system according to Embodiment 3, 4 of the present invention.

Referring to FIG. 4, there is illustrated the general configuration of a communications system according to Embodiment 3 of the present invention. This communications system comprises communications terminal apparatuses 401, 402, and repeater 403 connected to communications terminal apparatus 401 through communications network 404 and connected to communications terminal apparatus 402 through communications network 405.

DTMF signal processing apparatus 101, 301 of Embodiment 1, 2 is incorporated in part of each of communications terminal apparatuses 401, 402 and repeater 403. Communications networks 404, 405 may be line networks or IP networks, but are not particularly limited. Communications terminal apparatuses 401, 402 in turn may be mobile terminals, or IP terminals used in an IP network. While one repeater 403 and two communications terminal apparatuses 401, 402 are illustrated in FIG. 4 for facilitating the description, a plurality of repeaters may intervene on a communications path, and three or more communications terminal apparatuses may also be installed in the communications system.

Repeater 403 has a function of transmitting speech encoded data resulting from the erasure of a DTMF signal included in the speech encoded data received thereby. Repeater 403 may further have at least one of the following functions (i)-(v).

(i) A function of detecting a DTMF signal transmitted thereto as speech data, and switching transmission processing for data transmitted toward forward communications terminal apparatuses from repeater 403, as viewed from a communications terminal device which has originated the DTMF signal based on the result of the detection. For example, a function of controlling the start, stop, switching and the like of a transmission, triggered by a detected DTMF signal, of particular speech data or video data, to the forward communications terminal apparatuses instead of speech data from the originating communications terminal apparatus. Alternatively, a function of notifying the originating communications terminal apparatus of a detected DTMF signal to force the originating communications terminal apparatus to start, stop, and switch the transmission of speech data.

(ii) A function of detecting a DTMF signal transmitted thereto as speech data, and switching transmission processing for data transmitted from repeater 403 toward the communications terminal apparatus which has originated the DTMF signal based on the result of the detection. For example, a function of switching speech data transmitted toward the communications terminal apparatus which has originated the DTMF signal. A function of switching a display of video data transmitted toward the communications terminal apparatus which has originated the DTMF signal. A function of transmitting the particular video data also toward the communications terminal apparatus which has originated the DTMF signal in aforementioned function (i) in order to confirm the particular video signal.

(iii) A function of converting a coding standard associated with encoded media data (speech data, video data, character data and the like) received from one communications terminal apparatus to a coding standard associated with another communications terminal apparatus.

(iv) A function of converting a call control standard which terminates a communications network associated with one communications terminal apparatus side to a call control standard which terminates a communications network associated with another communications terminal apparatus side.

(v) A function of converting at least one unit of encoded media data received from a plurality of communications terminal apparatuses to mixed encoded media data (for example, converting a plurality of encoded speaker speech data to a single unit of speech encoded data when speech data is concerned, converting a plurality of encoded speaker video data to single encoded video data after they have undergone processing such as reduction, combination or the like, when video data is concerned, and converting a plurality of pieces of speaker character data information to a combined character string information format which is a set of speaker information and character data when character data is concerned), and transmitting the converted data to a plurality of communications terminal apparatuses.

It should be noted that even when repeater 403 has any of functions (i)-(v), repeater 403 receives speech data or data loss/error information and delivers speech data as long as DTMF signal processing apparatus 101 of Embodiment 1 is incorporated in repeater 403. Also, when DTMF signal processing apparatus 302 is incorporated in repeater 403, repeater 403 receives speech data, speech encoded data, or data loss/error information, and delivers speech encoded data.

Figure 5:
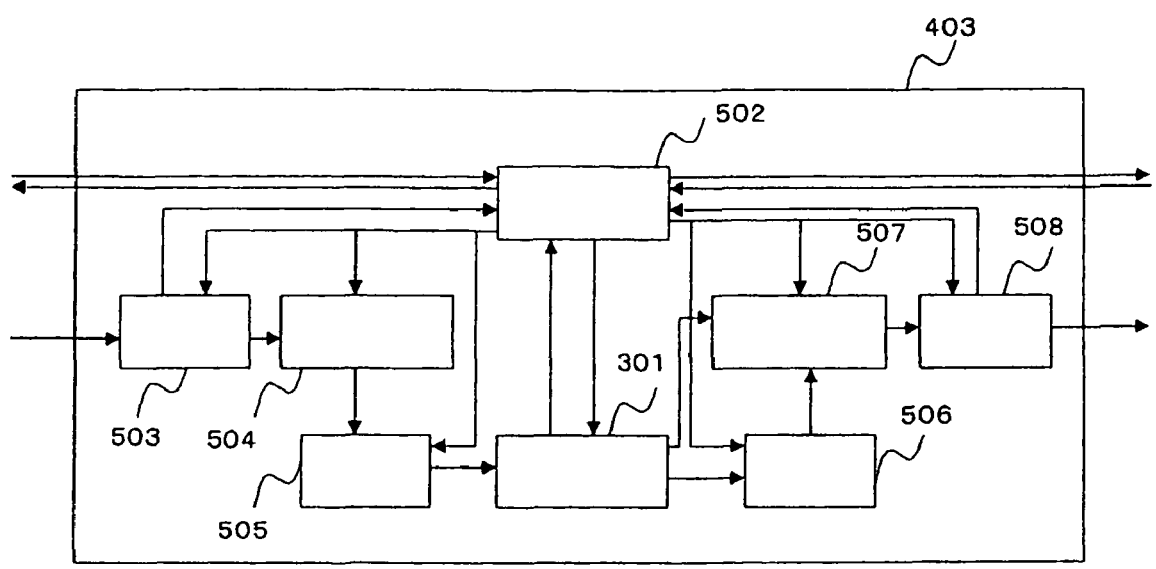
FIG. 5 is a block diagram illustrating the configuration of a repeater according to Embodiment 3 of the present invention.

Referring to FIG. 5, there is illustrated the configuration of repeater 403 according to Embodiment 3 of the present invention. This repeater 403 comprises setting/call connection processing unit 502, communications terminal termination unit 503, speech encoded data acquisition unit 504, decoder unit 505, DTMF signal processing apparatus 301, encoder unit 506, speech encoded data transmission unit 507, and communications terminal termination unit 508.

Whereas repeater 403 of FIG. 5 incorporates DTMF signal processing apparatus 301 of Embodiment 2, DTMF signal processing apparatus 101 of Embodiment 1 may be incorporated instead. For this reason, the DTMF signal processing apparatus is numbered 301 (101) in the following description.

Also, for facilitating description, DTMF signal processing apparatus 301 (101) is incorporated for processing communications in one direction from one communications terminal apparatus to the other communications terminal apparatus in FIG. 5. However, for performing processing on communications in the opposite direction, repeater 403 may also comprise a configuration similar to the foregoing configuration.

Setting/call connection processing unit 502 transmits and receives call control information to and from a communications terminal apparatus, and sets necessary information (for example, a speech coding standard, a communications network termination standard, and a variety of setting information) for communications network termination unit 503, speech encoded data acquisition unit 504, decoder unit 505, DTMF signal processing apparatus 301 (101), encoder unit 506, speech encoded data transmission unit 507, and communications network termination unit 508. Setting/call connection processing unit 502 is not particularly limited to the call connection standard. Also, upon receipt of a notification of a detected DTMF signal from DTMF signal processing apparatus 301 (101), setting/call connection processing unit 502 may perform operations in accordance with the DTMF signal such as switching of the operation within repeater 403, notification to a communications terminal apparatus, and the like.

Communications network termination unit 503 terminates a communications network associated with the originating communications terminal apparatus, and supplies speech information including speech encoded data to speech encoded data acquisition unit 504.

Speech encoded data acquisition unit 504 extracts speech encoded data from the speech information supplied from communications network termination unit 503, and supplies the extracted speech encoded data to decoder unit 505 together with data loss/error information indicative of the presence or absence of data loss or data error.

Decoder unit 505 decodes the speech encoded data supplied from speech encoded data acquisition unit 504 in accordance with a speech coding standard previously set by setting/call connection processing unit 502, and supplies the decoded speech data to DTMF signal processing apparatus 301 (101) together with the original speech encoded data and data loss/error information.

DTMF signal processing apparatus 301 (101) erases a DTMF signal from the speech data supplied from encoder unit 505, and supplies encoder unit 506 with the speech data from which the DTMF signal has been erased. Alternatively, DTMF signal processing apparatus 301 erases a DTMF signal from the speech encoded data supplied from decoder unit 505, and supplies speech encoded data transmission unit 507 with speech encoded data from which the DTMF signal has been erased. Since detailed operations of DTMF signal processing apparatus 301 (101) have been described in Embodiment 2 (Embodiment 1), a description thereon is omitted here.

Encoder unit 506 encodes the speech data supplied from DTMF signal processing apparatus 301 (101) in accordance with the speech coding standard set by setting/call connection processing unit 502, and supplies speech encoded data transmission unit 507 with the resultant speech encoded data and the result of the determination indicating whether or not the speech encoded data should be erased.

Speech encoded data transmission unit 507 converts the speech encoded data supplied from encoder unit 506 or the speech encoded data supplied from DTMF signal erasure processing unit 301 to a data format suitable for a communications network associated with a destination communications terminal apparatus (for example, convert to RTP [Real-time Transport Protocol], to a time length of a speech section corresponding to one transmission unit, and the like), and supplies the converted speech encoded data to communications network termination unit 508.

Here, when the communications network associated with the destination communications terminal apparatus is an IP network, speech encoded data transmission unit 507 performs at least one of the following operations (X)-(Z) in accordance with the result of the determination which indicates whether or not the speech encoded data should be erased, and the contents are set by setting/call connection processing unit 502.

(X) The speech encoded data is transmitted after it is arranged into packets if setting/call connection processing unit 502 has set that the speech encoded data is transmitted at any time.

(Y) When setting/call connection processing unit 502 has permitted intermittent transmissions of speech encoded data, the speech encoded data is not arranged into packets or transmitted if the result of the determination indicates that the speech encoded data should be erased.

(Z) When setting/call connection processing unit 502 permits intermittent transmissions of speech encoded data, an RTP header that sets the value indicative of an audible sound start time, for example, is added to the speech encoded data, and the resultant speech encoded data is transmitted after it is arranged into packets if the result of the determination indicates that the speech encoded data should not be erased.

Advantageously, when the speech encoded data is not transmitted, the DTMF signal is not heard by the user of the destination communications terminal apparatus, as is the case where the DTMF signal is actually erased, leading to effective utilization of the bandwidth for the destination communications terminal apparatus as well.

Communications terminal termination unit 508 terminates the communications network associated with the destination communications terminal apparatus, and sends speech information including the speech encoded data which has been converted to a data format that is suitable to the communications network.

As described above, this embodiment is configured to have repeater 403 interposed between communications terminal apparatuses 401, 402. Because the originating communications terminal apparatus transmits a DTMF signal as speech data, repeater 403 erases the DTMF signal while suppressing a delay in speech.

It is therefore possible to realize bidirectional media communication while suppressing an increased delay in speech associated with the erasure of the DTMF signal, without the DTMF signal being heard by the user of the destination communications terminal apparatus.

Specifically, in this embodiment, repeater 403 incorporates DTMF signal processing apparatus 301 (101) of Embodiment 2 (Embodiment 1). Repeater 403 terminates a communications network associated with the originating communications terminal apparatus, and acquires speech encoded data which is decoded to speech data. When the speech data is provided from DTMF signal processing apparatus 301 (101), repeater 403 encodes it to speech encoded data which is delivered in a data format that is suitable to a communications network associated with the destination communications terminal apparatus. DTMF signal processing apparatus 301 (101) erases the DTMF signal while suppressing a delay in speech in a manner similar to that described in Embodiment 2 (Embodiment 1).

Accordingly, bidirectional communication can be realized without transmitting unnecessary DTMF signals to repeaters ahead of repeater 403 which incorporates DTMF signal processing apparatus 301 (101) or to a communications terminal apparatus on the reception side.

Embodiment 4

Figure 6:
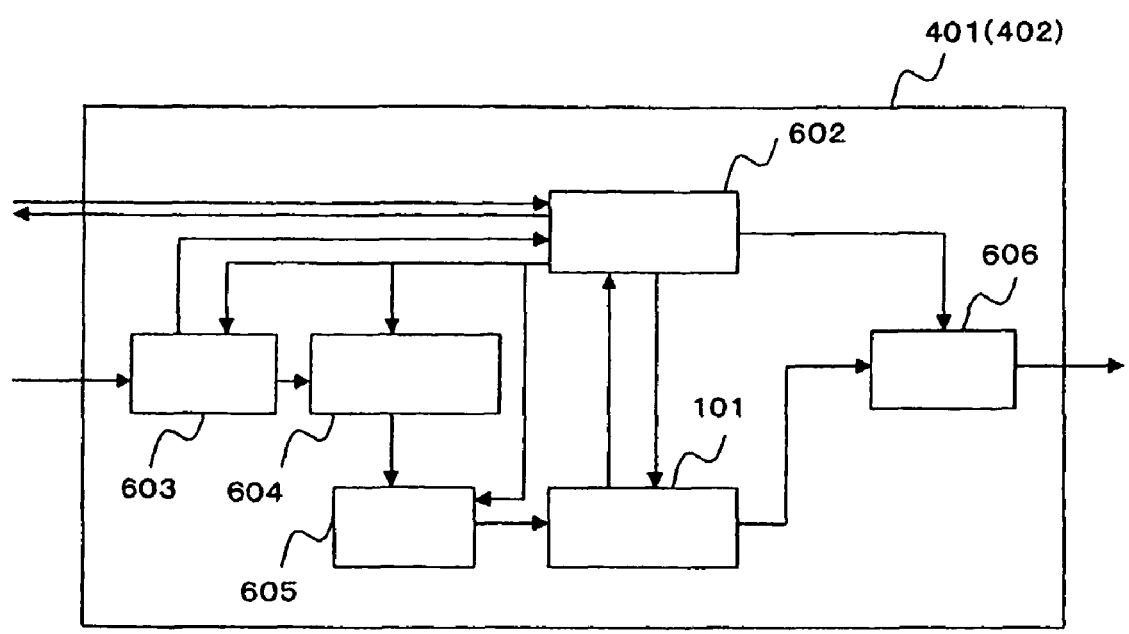
FIG. 6 is a block diagram illustrating the configuration of a communications terminal apparatus according to Embodiment 4.

Referring to FIG. 6, there is illustrated the configuration of communications terminal apparatus 401 (402) according to Embodiment 4 of the present invention. Communications terminal apparatus 401 (402) comprises setting/call connection processing unit 602, communications network termination unit 603, speech encoded data acquisition unit 604, decoder unit 605, DTMF signal processing apparatus 101, and speech reproduction unit 606.

In FIG. 6, communications network termination unit 603, speech encoded data acquisition unit 604, and decoder unit 605 correspond to communications network termination unit 503, speech encoded data acquisition unit 504, and decoder unit 505 in FIG. 5, respectively.

The following description will be centered on those aspects which differ from Embodiment 3 in FIG. 5. While FIG. 6 illustrates a communications terminal apparatus, which is a destination for speech data, in order to facilitate the description, the communications terminal apparatus may be an originator of speech data or a destination of other media data (for example, video data and character data).

Communications terminal apparatus 401 (402) has a function of erasing a DTMF signal included in received speech encoded data, and of reproducing the resultant speech data. In addition, communications terminal apparatus 401 (402) may provide value added services such as a display, a notification and the like of detection or erasure of a DTMF signal, if any, to the user in a media data format other than speech data.

Setting/call connection processing unit 602 transmits and receives call control information to and from repeater 403 connected thereto or to another communications terminal apparatus, and sets necessary information (for example, a speech coding standard, a communications network termination standard, and a variety of setting information) for communications network termination unit 603, speech encoded data acquisition unit 604, decoder unit 605, DTMF signal processing apparatus 101, and speech reproduction unit 606. There is no particular limitation for the use of any call connection standard.

Communications network termination unit 603 terminates a communications network, and supplies speech information including speech encoded data to speech encoded data acquisition unit 604.

Speech encoded data acquisition unit 604 extracts speech encoded data from the speech information supplied from communications network termination unit 603, and supplies the extracted speech encoded data to decoder unit 605 together with data loss/error information indicative of the presence or absence of a data loss or a data error.

Decoder unit 605 decodes the speech encoded data supplied from speech encoded data acquisition unit 604 in accordance with a speech coding standard previously set by setting/call connection processing unit 602, and supplies the decoded speech data to DTMF signal processing apparatus 101 together with the data loss/error information.

DTMF signal processing apparatus 101 erases a DTMF signal from the speech data supplied from decoder unit 605, and supplies speech reproduction unit 606 with the speech data from which the DTMF signal has been erased. Since detailed operations of DTMF signal processing apparatus 101 have already been described in Embodiment 1, a description thereof is omitted here.

Speech reproduction unit 606 reproduces the speech data supplied from DTMF signal processing apparatus 101. As a result, the user who uses the communications terminal apparatus can hear the speech, from which the DTMF signal has been removed, which is reproduced by speech reproduction unit 606.

As described above, in this embodiment, communications terminal apparatus 401 (402) incorporates DTMF signal processing apparatus 101 of Embodiment 1. Communications terminal apparatus 401 (402) terminates a communications network, and acquires speech encoded data for decoding to speech data. Then, communications terminal apparatus 401 (402) reproduces speech data provided from DTMF signal processing apparatus 101. In this event, DTMF signal processing apparatus 101 erases the DTMF signal while suppressing a delay in speech in a manner similar to that described in Embodiment 1.

Accordingly, by incorporating DTMF signal processing unit 101 in communications terminal apparatus 401 (402), bidirectional communication can be realized without the unnecessary DTMF signal being heard by the user who uses communications terminal apparatus 401 (402).

While preferred embodiments of the present invention have been described using specific terms, such description is for illustrative purposes only, and it is to be understood that changes and variations may be made without departing from the spirit or scope of the following claims.

What is claimed is:

1. A DTMF signal processing method executed by a DTMF signal processing apparatus which receives speech data from the outside, and processes a DTMF signal received as the speech data, said method comprising the steps of:

dividing the speech data into a plurality of divided speech data;

analyzing the divided speech data as to whether or not the divided speech data has a DTMF signal component;

applying a weighting value to the analyzed currently divided speech data, and also applying a weighting value to previously stored past divided speech data when the result of the analysis indicates that the currently divided speech data has a DTMF signal component;

storing the divided speech data and the weighting values applied to the divided speech data;

determining based on the stored weighting values whether or not to erase each unit of the stored divided speech data; and replacing the divided speech data with mute data or noise data and delivering the replaced data when the result of the determination indicates an erasure, and delivering the divided speech data, as is, when the result of the determination indicates a non-erasure.

2. A DTMF signal processing method executed by a DTMF signal processing apparatus which receives speech encoded data and speech data that is decoded from the speech encoded data from the outside, and processes a DTMF signal received as the speech data, said method comprising the steps of:

dividing the speech data into a plurality of divided speech data;

analyzing the divided speech data as to whether or not the divided speech data has a DTMF signal component;

applying a weighting value to the analyzed currently divided speech data, and also applying a weighting value to previously stored past divided speech data when the result of the analysis indicates that the currently divided speech data has the DTMF signal component;

storing the weighting values;

storing the speech encoded data;

determining based on the stored weighting values whether or not to erase each of the sections corresponding to the divided speech data in the stored speech encoded data; and replacing the speech encoded data with speech encoded data corresponding to mute data or noise data and delivering the replaced data when an erasure is indicated by at least one result of the determination for each of sections in the speech encoded data, and delivering the speech encoded data as they are when a non-erasure is indicated by all the results of the determinations for each of the sections in the speech encoded data.

3. The method according to claim 1, wherein said step of applying a weighting value includes applying a larger weighting value to the analyzed currently divided speech data than the weighting value applied to the previously stored past divided speech data when the result of the analysis indicates that the analyzed currently divided speech data has the DTMF signal component.

4. The method according to claim 1, wherein said step of applying a weighting value includes setting a hangover value to an effective value when the result of the analysis indicates that the divided speech data has the DTMF signal component, and subsequently applying a weighting value to the analyzed currently divided speech data during the period when the hangover value is effective even if the result of the analysis indicates that the analyzed divided speech data does not have a DTMF signal component.

5. The method according to claim 1, wherein said step of applying a weighting value includes generating either mute data or noise data instead of the divided speech data when only data loss/error information is fed from the outside, and applying the mute data or the noise data with the same weighting value as the weighting value applied to the preceding divided speech data.

6. The method according to claim 1, wherein said step of applying a weighting value performs one of the following processing operations when data loss/error information is applied from the outside together with the speech data:
(A) applying the currently divided speech data with the same weighting value as that applied to the preceding divided speech data irrespective of the result of the analysis; and
(B) applying the currently divided speech data with a weighting value, and also applying previously stored past divided speech data with a weighting value when divided speech data is indicated to have a DTMF signal component in the result of the analysis which is provided after the condition for analyzing has been relaxed.

7. The method according to claim 1, wherein said step of determining whether or not to erase the divided speech data includes determining that the earliest stored divided speech data is erased from among the stored divided speech data, when at least one of the following (a) and (b) is satisfied in a certain range starting from the divided speech data:
(a) the number of divided speech data, among divided speech data in the certain range, which have the weighting value that reaches a previously determined value, reaches a predefined number;
(b) the sum total of the weighting values applied to the divided speech data in the certain range reaches a predefined value.

8. The method according to claim 7, wherein said step of determining whether or not to erase the divided speech data includes determining that the divided speech data is to be erased when the result of the determination on the preceding divided speech data indicates an erasure, and a weighting value applied to the currently divided speech data is not zero.

9. The method according to claim 1, further comprising the step of detecting a section in which the speech data has a DTMF signal component based on at least one of the result of the analysis and the result of the determination, and notifying the result of the detection to the outside.

10. A DTMF signal processing apparatus which receives speech data from the outside, and processes a DTMF signal received as the speech data, said apparatus comprising:
data dividing unit for dividing the speech data into a plurality of divided speech data and delivering the divided speech data;
DTMF signal component analyzing unit for analyzing the divided speech data delivered from said data dividing unit as to whether or not the divided speech data has a DTMF signal component, and providing the result of the analysis;
weighting processing unit for applying a weighting value to the analyzed currently divided speech data, and also applying a weighting value to previously stored past divided speech data when the result of the analysis indicates that the currently divided speech data has a DTMF signal component;
a buffer for storing the divided speech data and the weighting values applied to the divided speech data;
DTMF signal erasure determining unit for determining based on the weighting values stored in said buffer whether or not to erase each unit of the divided speech data stored in said buffer, and delivering the result of the determination together with the divided speech data; and
DTMF signal erasure processing unit for replacing the divided speech data delivered from said DTMF signal erasure determining unit with mute data or noise data and delivering the replaced data when the result of the determination delivered from said DTMF signal erasure determining unit indicates an erasure, and delivering the divided speech data, as is, when the result of the determination indicates a non-erasure.

11. A DTMF signal processing apparatus which receives speech encoded data and speech data that is decoded from the speech encoded data from the outside, and processes a DTMF signal received as the speech data, said apparatus comprising:
data dividing unit for dividing the speech data into a plurality of divided speech data and delivering the divided speech data;
DTMF signal component analyzing unit for analyzing the divided speech data as to whether or not the divided speech data has a DTMF signal component, and providing the result of the analysis;
weighting processing unit for applying a weighting value to the analyzed currently divided speech data, and also applying a weighting value to previously stored past divided speech data when the result of the analysis indicates that the currently divided speech data has the DTMF signal component;
a buffer for storing the weighting values;
an encoded data buffer for storing the speech encoded data;
DTMF signal erasure determining unit for determining based on the weighting values stored in said buffer whether or not to erase each of sections corresponding to the divided speech data in the speech encoded data stored in said encoded data buffer, and for delivering the result of the determination together with the speech encoded data; and
DTMF signal erasure processing unit for replacing the speech encoded data delivered from said DTMF signal erasure determining unit with speech encoded data corresponding to mute data or noise data and for delivering the replaced data when an erasure is indicated by at least one result of the determination for each of the sections in the speech encoded data delivered from said DTMF signal erasure determining unit, and for delivering the speech encoded data as they are when a non-erasure is indicated by all the results of the determinations for each of the sections in the speech encoded data.

12. The DTMF signal processing apparatus according to claim 10, wherein said weighting processing unit applies a larger weighting value to the analyzed currently divided speech data than the weighting value applied to the previously stored past divided speech data when the result of the analysis provided from said DTMF signal component analyzing unit indicates that the analyzed currently divided speech data has the DTMF signal component.

13. The DTMF signal processing apparatus according to claim 10, wherein said weighting processing unit sets a hangover value to an effective value when the result of the analysis provided from said DTMF signal component analyzing unit indicates that the divided speech data has the DTMF signal component, and subsequently applies a weighting value to the analyzed currently divided speech data during the period when the hangover value is effective even if the result of the analysis indicates that the analyzed divided speech data does not have a DTMF signal component.

14. The DTMF signal processing apparatus according to claim 10, wherein said weighting processing unit generates either mute data or noise data instead of the divided speech data when only data loss/error information is fed from the outside, and applies the mute data or the noise data with the same weighting value as the weighting value applied to the preceding divided speech data.

15. The DTMF signal processing apparatus according to claim 10, wherein said weighting processing unit performs one of the following processing operations when data loss/error information is fed from the outside together with the speech data:
(A) processing for applying the currently divided speech data with the same weighting value as that applied to the preceding divided speech data irrespective of the result of the analysis provided from said DTMF signal component analyzing unit; and
(B) processing for applying the currently divided speech data with a weighting value, and also for applying previously stored past divided speech data with a weighting value when divided speech data is indicated to have a DTMF signal component in the result of the analysis which is provided after the condition for analyzing has been relaxed in said DTMF signal component analyzing unit.

16. The DTMF signal processing apparatus according to claim 10, wherein said DTMF signal erasure processing unit determines that the earliest stored divided speech data is erased from among the divided speech data stored in said buffer, when at least one of the following (a) and (b) is satisfied in a certain range starting from the divided speech data:
(a) the number of divided speech data, among divided speech data in the certain range, which have the weighting value that reaches a previously determined value, reaches a predefined number;
(b) the sum total of the weighting values applied to the divided speech data in the certain range reaches a predefined value.

17. The DTMF signal processing apparatus according to claim 16, wherein said DTMF signal erasure processing unit determines that the divided speech data is to be erased when the result of the determination on the preceding divided speech data indicates an erasure, and a weighting value applied to the currently divided speech data is not zero.

18. The DTMF signal processing apparatus according to claim 10, further comprising DTMF signal section detecting unit for detecting a section in which the speech data has a DTMF signal component based on at least one of the result of the analysis provided from said DTMF signal component analyzing unit and the result of the determination provided from said DTMF signal erasure determining unit, and notifying the result of the detection to the outside.

19. A repeater comprising:

first communications network terminating unit for terminating a communications network and delivering speech information including speech encoded data;
speech encoded data acquiring unit for extracting the speech encoded data from the speech information delivered from said first communications terminal terminating unit, and delivering the speech encoded data;
decoding unit for decoding the speech encoded data delivered from said speech encoded data acquiring unit and delivering the decoded speech data;
a DTMF signal processing apparatus for erasing a DTMF signal from the speech data delivered from said decoding unit and delivering the speech data from which the DTMF signal has been erased;
encoding unit for encoding the speech data delivered from said DTMF signal processing unit, and delivering the speech encoded data;
speech encoded data transmitting unit for converting the speech encoded data delivered from said encoding unit into a data format suited to a destination, and delivering the converted speech encoded data; and
second communications network terminating unit for terminating a communications network that supplies the speech encoded data delivered from said speech encoded data transmitting unit to the destination,
wherein said DTMF signal processing apparatus comprises:
data dividing unit for dividing the speech data delivered from said decoding unit into a plurality of divided speech data and delivering the divided speech data;
DTMF signal component analyzing unit for analyzing the divided speech data delivered from said data dividing unit as to whether or not the divided speech data has a DTMF signal component, and providing the result of the analysis;
weighting processing unit for applying a weighting value to the analyzed currently divided speech data, and also applying a weighting value to previously stored past divided speech data when the result of the analysis indicates that the currently divided speech data has a DTMF signal component;
a buffer for storing the divided speech data and the weighting values applied to the divided speech data;
DTMF signal erasure determining unit for determining based on the weighting values stored in said buffer whether or not to erase each unit of the divided speech data stored in said buffer, and delivering the result of the determination together with the divided speech data; and
DTMF signal erasure processing unit for replacing the divided speech data delivered from said DTMF signal erasure determining unit with mute data or noise data and delivering the replaced data when the result of the determination delivered from said DTMF signal erasure determining unit indicates an erasure, and delivering the divided speech data, as is, when the result of the determination indicates a non-erasure.

20. A communications terminal apparatus comprising:
communications terminal terminating unit for terminating a communications network and delivering speech information including speech encoded data;
speech encoded data acquiring unit for extracting speech encoded data from the speech information delivered from said communications network terminating unit, and delivering the speech encoded data;
decoding unit for decoding speech encoded data delivered from said speech encoded data acquiring unit and delivering decoded speech data;

a DTMF signal processing apparatus for erasing a DTMF signal from the speech data delivered from said decoding unit and delivering the speech data from which the DTMF signal has been erased; and speech reproducing unit for reproducing the speech data delivered from said DTMF signal processing apparatus, wherein said DTMF signal processing apparatus comprises:

data dividing unit for dividing the speech data delivered from said decoding unit into a plurality of divided speech data, and delivering the divided speech data;

DTMF signal component analyzing unit for analyzing the divided speech data delivered from said data dividing unit as to whether or not the divided speech data has a DTMF signal component, and providing the result of the analysis;

weighting processing unit for applying a weighting value to the analyzed currently divided speech data, and also applying a weighting value to previously stored past divided speech data when the result of the analysis indicates that the currently divided speech data has a DTMF signal component;

a buffer for storing the divided speech data and the weighting values applied to the divided speech data;

DTMF signal erasure determining unit for determining based on the weighting values stored in said buffer whether or not to erase each unit of the divided speech data stored in said buffer, and delivering the result of the determination together with the divided speech data; and DTMF signal erasure processing unit for replacing the divided speech data delivered from said DTMF signal erasure determining unit with mute data or noise data and delivering the replaced data when the result of the determination delivered from said DTMF signal erasure determining unit indicates an erasure, and delivering the divided speech data, as is, when the result of the determination indicates a non-erasure.

* * * * *